(12) United States Patent
Moore et al.

(10) Patent No.: US 6,823,249 B2
(45) Date of Patent: Nov. 23, 2004

(54) TRACTOR WITH MONITORING SYSTEM

(75) Inventors: Mark Ramon Moore, Kenilworth (GB); Karen Christina Murray, Totnes (GB)

(73) Assignee: Agco Limited, Coventry (GB)

(*) Notice: Subject to any disclaimer, the term of this patent is extended or adjusted under 35 U.S.C. 154(b) by 14 days.

(21) Appl. No.: 09/756,822

(22) Filed: Jan. 9, 2001

(65) Prior Publication Data

US 2001/0001844 A1 May 24, 2001

Related U.S. Application Data

(63) Continuation of application No. 09/043,982, filed as application No. PCT/GB96/02216 on Sep. 9, 1996, now Pat. No. 6,195,604.

(51) Int. Cl.[7] .............................. G06F 7/70; G06F 19/00; G06F 7/00
(52) U.S. Cl. .................... 701/50; 701/207; 701/208; 701/212; 701/213; 342/357.09; 342/357.17
(58) Field of Search .......................... 701/50, 33, 54, 701/34, 55, 53, 56, 35, 207; 111/130, 903, 200, 118; 340/991, 988, 995, 994, 689, 990; 364/457

(56) References Cited

U.S. PATENT DOCUMENTS

| | | | |
|---|---|---|---|
| 4,191,270 A | | 3/1980 | Monteith ..................... 180/53 |
| 4,296,409 A | | 10/1981 | Whitaker et al. ............ 340/684 |
| 4,376,298 A | | 3/1983 | Sokol et al. ................. 364/551 |
| 4,630,773 A | | 12/1986 | Ortlip ............................ 239/1 |
| 4,715,012 A | | 12/1987 | Mueller, Jr. .................. 364/900 |
| 4,990,922 A | | 2/1991 | Young et al. .................. 342/52 |
| 5,050,771 A | | 9/1991 | Hanson et al. .................. 222/1 |
| 5,204,814 A | | 4/1993 | Noonan et al. ........ 364/424.02 |
| 5,220,876 A | * | 6/1993 | Monson et al. ............. 111/130 |
| 5,282,389 A | | 2/1994 | Faivre et al. ............. 73/861.73 |
| 5,323,721 A | | 6/1994 | Tofte et al. .................. 111/200 |
| 5,328,298 A | | 7/1994 | Maffatone .................... 405/185 |
| 5,353,034 A | | 10/1994 | Sato et al. ................... 342/457 |
| 5,402,340 A | | 3/1995 | White et al. ................. 364/420 |
| 5,897,600 A | * | 4/1999 | Elmore et al. ................. 701/50 |
| 5,919,242 A | * | 7/1999 | Greatline et al. ............. 701/50 |
| 5,955,973 A | * | 9/1999 | Anderson .................... 340/988 |
| 5,987,371 A | * | 11/1999 | Bailey et al. .................. 701/50 |
| 5,991,694 A | * | 11/1999 | Gudat et al. .................... 702/2 |
| 5,995,888 A | * | 11/1999 | Hagenbuch .................. 701/35 |

FOREIGN PATENT DOCUMENTS

| | | | |
|---|---|---|---|
| CA | WO-8606190 | * | 4/1986 |
| DE | 43 22 293 A1 | | 1/1995 |
| EP | 0 151 434 A1 | | 8/1985 |
| EP | 0 156 529 A1 | | 10/1985 |
| EP | 0 191 287 A1 | | 8/1986 |
| EP | 0 215 948 A1 | | 4/1987 |
| EP | 0 241 161 A1 | | 10/1987 |
| EP | 0 323 245 A1 | | 7/1989 |
| EP | 0 442 279 A1 | | 8/1991 |

(List continued on next page.)

*Primary Examiner*—Thomas G. Black
*Assistant Examiner*—Ronnie Mancho
(74) *Attorney, Agent, or Firm*—MacMillan, Sobanski & Todd, LLC

(57) ABSTRACT

A tractor includes a cab mounted analysis/display unit (1) connected to a number of on-board sensors for detecting speed, fuel flow, etc and also capable of receiving data input manually or via a data carrier. The unit (1) is also connected to an on-board GPS navigation system (24), and includes means for generating maps of tractor-related parameters and/or parameters derived therefrom. The math usefulness of the system is in derby "on the go" maps of cost related data for a given field operation. Cost maps for cumulative operations and maps of gross profit margin are possible by adding "on the go" generated cost data to previously generated cost and/or yield data as the tractor performs an operation in a field.

15 Claims, 2 Drawing Sheets

FOREIGN PATENT DOCUMENTS

| | | |
|---|---|---|
| EP | 0 522 829 A2 | 1/1993 |
| EP | 0 578 325 A1 | 1/1994 |
| EP | 0 593 853 A1 | 4/1994 |
| GB | 2093676 A * | 2/1981 |
| GB | 2 087 566 A | 5/1982 |
| GB | 2 092 301 A | 8/1982 |
| GB | 2 093 676 A | 9/1982 |
| GB | 2 178 934 A | 2/1987 |
| GB | 2 277 152 A | 10/1994 |
| SU | 1 630 625 A | 2/1991 |
| WO | WO 86/06035 | 10/1986 |
| WO | WO 91/03148 | 3/1991 |
| WO | WO 94/28503 | 12/1994 |
| WO | WO 95/16228 | 6/1995 |

* cited by examiner

TRACTOR WITH MONITORING SYSTEM

This application is a continuation of 09/043982 filed Mar. 19, 1999 and now U.S. Pat. No. 6,195,604 which is a 371 PCT/GB96/02216 filed September 1996.

BACKGROUND OF THE INVENTION

The present invention relates to a tractor with a monitoring system and means for locating the tractor.

It is known to display sensed parameters on an electronic tractor monitoring system. It is also known to provide a location system, eg a GPS satellite location system, in a combine harvester and to combine information from such a system with, for example, a continuous signal representative of the rate of flow of grain entering the harvester, thereby to produce a "yield map" showing grain yield as a map over an area where the combine harvester has travelled.

SUMMARY OF THE INVENTION

The object of the present invention is to provide a tractor with an improved monitoring system.

BRIEF DESCRIPTION OF THE DRAWINGS

Further features and details of the present invention will be apparent from the following specific description given by way of example only with reference to the accompanying drawings in which.

DETAILED DESCRIPTION OF THE PREFERRED EMBODIMENTS

Figure 1:
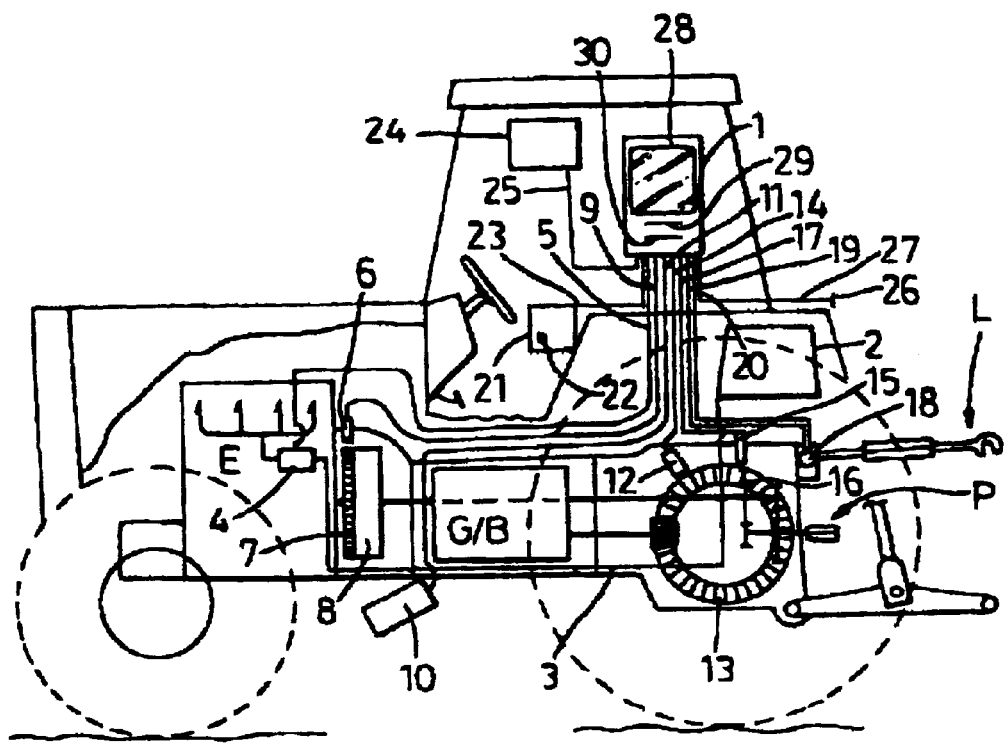
FIG. 1 is a schematic side sectional view of a tractor in accordance with the invention.

Referring firstly to FIG. 1, a tractor in accordance with the invention comprises the standard elements of an engine E, gearbox G/B, PTO output shaft P, and three point linkage L.

Situated in the tractor cab is an electronic monitoring system analasys/display unit 1 into which run lines from a number of electronic sensors an the tractor.

A fuel tank 2 is housed at the rear of tractor and a fuel line 3 passes from the tank to the engine E via a fuel flow sensor 4. An electronic output from the fuel flow sensor 4 is connected via line 5 to the display unit 1.

A further sensor 6 for detecting engine speed, is of the magnetic inductance type and is mounted adjacent a gear 7 which drives the engine oil pump. The electronic output of the sensor 6 is connected via a line 9 to the display unit 1.

A radar speed sensor 10 is mounted underneath the tractor for detecting actual speed over the ground. The sensor 10 is connected via a line 11 to the display unit 1.

A further magnetic inductance sensor 12 is associated with the crown wheel 13 on the rear axle of the tractor for detecting "theoretical" forward speed (ie forward speed with no wheel slip). The electronic output of the inductance sensor 12 is connected via a line 14 to the display unit 1.

A further magnetic inductance sensor 15 is associated with the power take off gearbox 16 and detects the PTO speed. The electronic output of the sensor 15 is connected via a line 17 to the display unit 1.

The three point linkage L has both draft force and position sensors associated with the top link joint, the sensors being commonly shown in FIG. 1 by the numeral 18. The force sensor is of known type, taking the form of a joint pin incorporating strain gauges. The electronic output from the force sensor is connected via a signal line 19 to the display unit 1. The position of the linkage, that is to say its height, is measured by a rotary potentiometer associated with the top link joint. The potentiometer is connected via a line 20 to the display unit 1.

Situated in the tractor cab is an electronic linkage control unit 21 of known type, which includes a linkage lift/lower control 22. The electronic linkage control unit is connected via a line 23 to the display unit 1.

The tractor is fitted with a GPS satellite navigation system 24 which is connected via signal line or lines 25 to the display unit 1.

Finally, a socket 26 is provided for receive an input signal from an implement connected to the tractor, and this is connected via a line 27 to the display unit 1.

The display unit 1 includes a touch sensitive screen 28 via which a number of functions connected with monitoring/displaying tractor parameters may be selected and controlled. The unit 1 also allows the various parameters as sensed on the tractor, as well as information derived therefrom, to be displayed on the screen 28, or alternatively output on to a data carrier inserted into a slot 29, or alternatively output in printed form on a paper tape output from slot 30.

The display unit 1 is essentially also a data processing unit, as will be appreciated from what has been said above. The unit includes an integral clock, a microprocessor and electronic memory. Software to enable the functions described above to be performed, is stored and implemented by the unit 1. The unit 1 is programmed to accept the input of certain parameters either manually via the touch screen or via a data carrier, such as a magnetic disk or PCMIA card inserted in to the slot 29. The unit 1 is also programmed to receive information from the GPS navigation system 24 and combine this with any of the parameters sensed by the various sensors around the tractor together with any relevant data input manually or via a data carrier. In this way, the unit produces maps of tractor speed information which may be combined with manually input information.

At its simplest level, the system may be used to generate, for example, a map of fuel used per hectare when performing an operation with a soil penetrating implement. To generate such a map, the unit 1 would employ information from the GPS unit 24, from the fuel flow sensor 4, from the tractor speed sensor 10 and from a manual input representative of the width of the implement being used, and thus the width of the strip of field processed on any given run of the tractor. The unit 1 would also use the input from the electronic linkage control 21, which includes an indication of whether the implement is in a raised or lowered condition and therefore out of work or in work. Lastly, the unit 1 would use information from its integral clock.

A realistic map of fuel used per hectare may then be generated by continuously sensing the fuel flow data from the sensor 4 and continuously calculating the rate at which area is being covered (derived from speed and implement width), and sampling these parameters repeatedly at known positions of the tractor (from the GPS). At each sampling point, a value for fuel used since the last sample is divided by hectares covered since the last sample and this fuel/hectare value correlated to tractor position. At the end of each run, the linkage will of course be raised to bring the implement out of work and this fact will be recognised by the unit 1 from the signal on line 23 from the electronic linkage control 21 The amount of fuel used from the time the implement is lifted out of work until the time it is returned into work at the start of the next run can be retrospectively added to the series of fuel/hectare values for the previous run, being apportioned equally over all the readings. Alternatively, the value for fuel used can be stored and then apportioned equally over the readings for the next run. Either way, the fuel used per hectare figure for a narrow portion of field with very short runs will reflect the fact that the tractor spends a relatively large percentage of its time turning on headlands.

In a simple modification of the above process, the fuel used per hectare figure can be amended to a fuel cost per hectare figure by the simple incorporation of a manually input unit fuel cost figure.

It will be appreciated that the operation described above involves automatic sensing of lifting and lowering of the tractor linkage at each end of a run (simply by noting the position of the lift/lower switch 22). Alternatively, in an operation where the linkage is not lifted and lowered at the end/start of each run (eg spreading fertiliser), a further manual input can be provided in the form of an icon on the touch screen which is touched at the end and the start of each run. Alternatively, this information could be input directly from the implement via the socket 26 and line 27. There could also be some form of connection between the unit 1 and a cab mounted implement control unit to achieve the same result.

The above described operation is a novel and relatively simple way of providing an indication of the cost of performing a process on a field, showing how that cost is distributed across the field. A more useful way of doing this is to combine all or at least most of the sensed tractor parameters described above with data input manually or via a data carrier as follows:

1 cost of tractor driver per hour;

2 depreciation of tractor per hour;

3 maintenance cost of tractor per hour;

4 a parameter representative of tractor tire cost per hour;

5 a parameter representative of soil type.

The cost of a driver's wages, depreciation and maintenance need no explanation; their effect on the cost of the tractor operation is self-explanatory. Actual tractor tire wear is influenced by a number of factors, so a basic tire cost parameter is used representing purchase cost depreciated over an average tyre lifetime. This is then modified by the unit 1 according to the soil type parameter, since certain types of soil will wear a tire quicker than others. Other factors used to calculate actual tyre wear, and therefore cost, are wheel slip, which is directly calculated from the actual speed sensor 10 and theoretical speed sensor 12, draft force from the draft force sensor 18 assuming a soil penetrating implement is attached, and forward speed from the sensor 10.

A possibility with this system is the generation of cumulative treatment cost maps. A previously generated cost map for a given treatment, eg ploughing a field, may be inserted into the unit 1, and then information relating to the cost of a second process added as the second process is performed. If this is done for every treatment applied to the field, a reasonably true indication of the cost of growing that crop, as mapped across the fields may be produced. In addition, the previous year's yield in the form of a map on a data carrier may be input into the unit 1 together with a manually input figure representative of the value of the crop per tonne.

In this way, a "gross margin" map can be produced which gives a direct indication of which parts of the field are more profitable than others and which may show that some parts of the field are actually making a loss.

For some field operations, the cost is going to be relatively uniform and mapping, therefore, not really worthwhile. In this case, a manually input constant value of cost/hectare may be used for one or more of the field processes, when generating a cumulative cost map as described above.

A useful variation of the above is to produce a map of "field efficiency", that is to say the percentage of time spent working the field as opposed to turning on headlands, combined with a constant value for cost/hour. Cost/hectare is then calculated "on the go" during a run, based on speed and implement width, and sampled at intervals for mapping as with the previously described mapping processes. At the and of each run, the cost of the time spent turning before starting the next run is calculated and averaged over the sampled values (or alternatively stored and then averaged over the sampled values for the next run). A refinement of this would be to have different constant cost/hour values for "in work" and "out of work".

A map of field efficiency alone can also be very useful, ie a map simply showing an efficiency value for each tractor run. Such a map may be used to design field shapes and/or the direction of ploughing etc.

It should be noted that field efficiency will vary between processes; the time spent on headlands will generally be much more significant for a fast process than a slow one.

For any map of cost related data, field efficiency is one of the major factors contributing to cost and may be used in many different ways.

Although mapping cost related parameters is very useful, this invention is not restricted to the mapping of cost related parameters. A map showing one of the tractor sensed parameters mentioned above as distributed over a field during a given treatment process can be useful in its own right. For example, the variation of PTO speed during a fertiliser spreading process can be useful to monitor since the map may show that PTO speed dropped to an unacceptable level for part of the time, in which case the spread of fertiliser may have been inadequate and may require subsequent treatment to ensure that sufficient fertiliser is applied. Such a map could be derived using data either from the PTO speed senior or engine speed sensor, since the PTO gear ratio will be a known constant.

Another parameter which could usefully be mapped during, say, a ploughing operation, is linkage height. If the linkage control is in draft control mode, as is conventional for a ploughing operation, the linkage height will be automatically adjusted to maintain draft force constant. Consequently, a map of linkage height gives an indication of where areas of difficult soil are.

Figure 2:
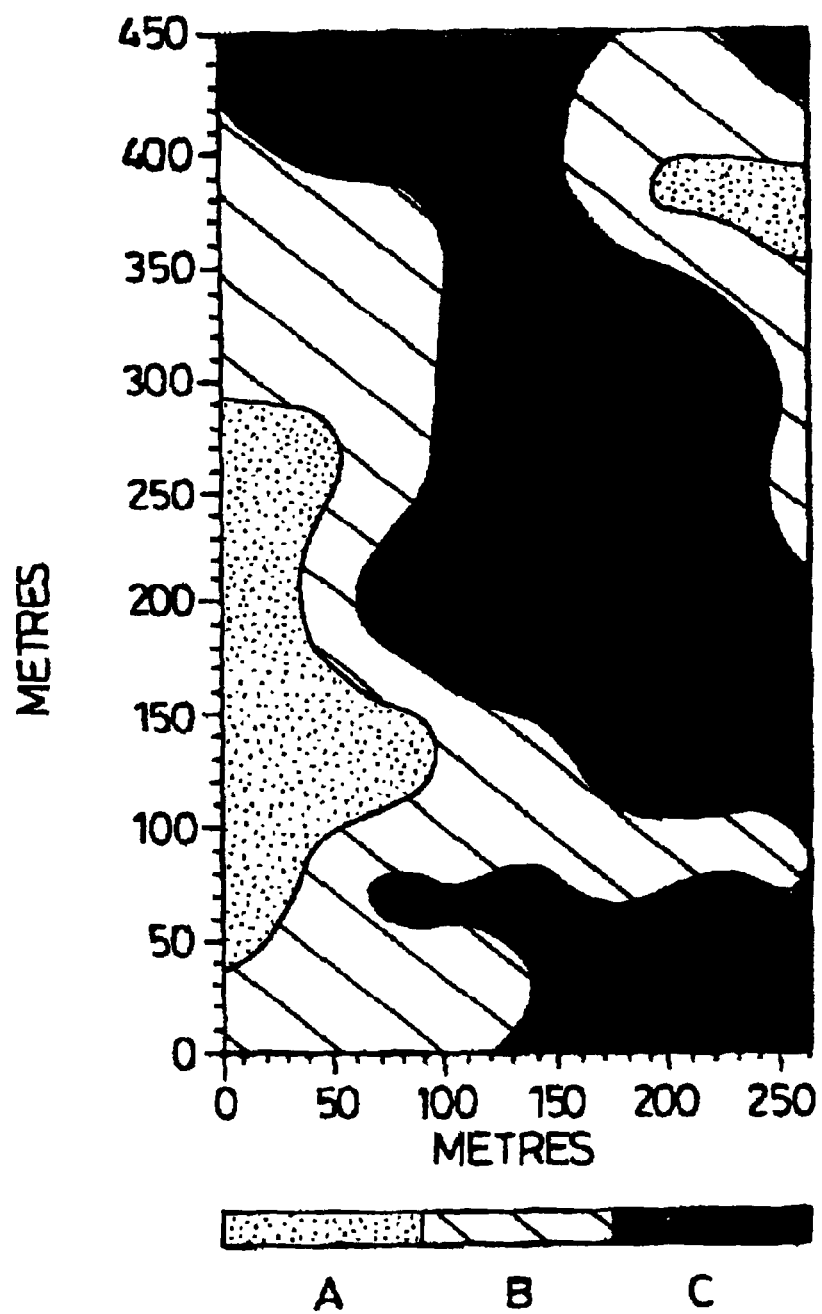
FIG. 2 is an example map produced in accordance with the invention.

For any of the types of map described above, the presentation of the map will be most useful if a certain shading or colour is given to each area of the field map where the mapped parameter falls in a given range. An example of this is shown in FIG. 2 where three ranges of mapped parameter are used, A, B and C. The actual parameter shown on this map is unimportant—it could be any of those described above or any number of other possibilities.

The software with which the unit 1 is programmed has the facility to allow selection of ranges for creating a map of the form shown in FIG. 2.

What is claimed is:

1. An apparatus for mapping the performance of an agricultural tractor during operation in an agricultural field comprising:

a sensor that generates a signal that is representative of an operating characteristic of the agricultural tractor; and a controller that is responsive to said signal from said sensor and that generates a performance map of the performance of the agricultural tractor as a function of an area in the agricultural field in which the agricultural tractor is operated.

2. The apparatus defined in claim 1 wherein said sensor is an engine sensor that generates a signal that is representative of an operating characteristic of an engine provided on the agricultural tractor.

3. The apparatus defined in claim 2 wherein said engine sensor is a sensor that generates a signal that is representative of the speed of the engine.

4. The apparatus defined in claim 2 wherein said engine sensor is a sensor that generates a signal that is representative of the amount of fuel supplied to the engine.

5. The apparatus defined in claim 1 wherein said sensor is a speed sensor that generates a signal that is representative of the speed of the tractor.

6. The apparatus defined in claim 1 wherein said sensor is a power take off sensor that generates a signal that is representative of an operating characteristic of a power take off provided on the agricultural tractor.

7. The apparatus defined in claim 6 wherein said power take off sensor is a sensor that generates a signal that is representative of the speed of the power take off.

8. The apparatus defined in claim 1 wherein said sensor is a linkage sensor that generates a signal that is representative of an operating characteristic of a three point linkage provided on the agricultural tractor.

9. The apparatus defined in claim 8 wherein said linkage sensor is a sensor that generates a signal that is representative of the draft force of the three point linkage.

10. The apparatus defined in claim 8 wherein said linkage sensor is a sensor that generates a signal that is representative of the position of the three point linkage.

11. The apparatus defined in claim 1 wherein said sensor is a position sensor that generates a signal that is representative of the position of the tractor in the agricultural field.

12. The apparatus defined in claim 11 wherein said position sensor is a global satellite navigation system.

13. The apparatus defined in claim 1 further including an actual speed sensor that generates a signal that is representative of the actual speed of the agricultural tractor over ground, said controller being responsive to said signals from said sensor and said actual speed sensor and generating the performance map.

14. The apparatus defined in claim 1 further including a theoretical speed sensor that generates a signal that is representative of the theoretical speed of the agricultural tractor over ground if no wheel slip is occurring, said controller being responsive to said signals from said sensor and said theoretical speed sensor and generating the performance map.

15. The apparatus defined in claim 1 further including a manual input device that generates a signal that is representative of a parameter, said controller being responsive to said signals from said sensor and said manual input device for generating the performance map.

* * * * *